Figure 1:
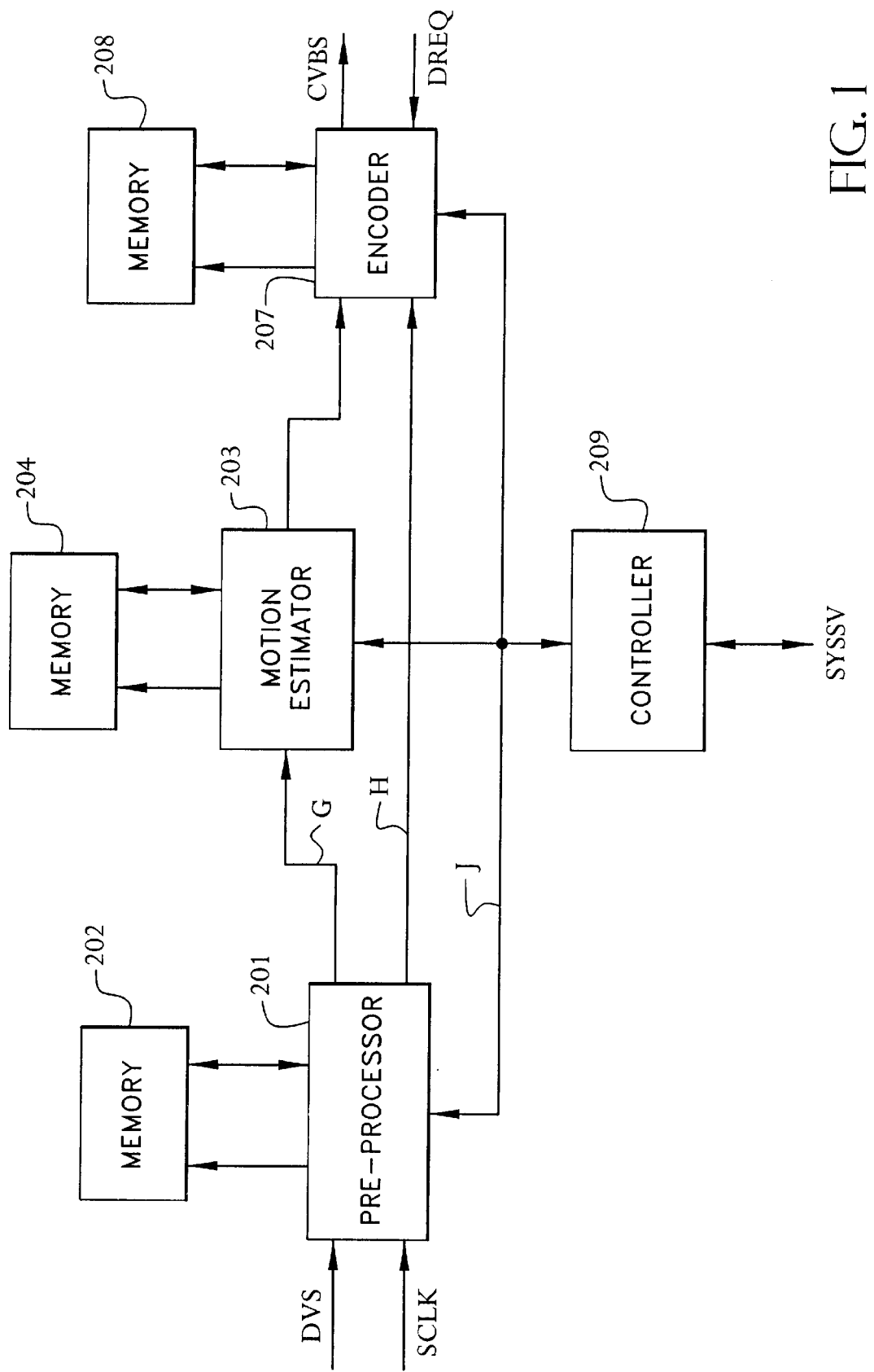

United States Patent
Canfield et al.

[11] Patent Number: 6,064,450
[45] Date of Patent: May 16, 2000

[54] DIGITAL VIDEO PREPROCESSOR HORIZONTAL AND VERTICAL FILTERS

[75] Inventors: Barth Alan Canfield, Indianapolis, Ind.; Friedrich Rominger, Brigachtal; Detlef Teichner, Könlgsfeld, both of Germany

[73] Assignee: Thomson Licensing S.A., Boulogne Cedex, France

[21] Appl. No.: 08/753,354

[22] Filed: Nov. 25, 1996

[30] Foreign Application Priority Data

Dec. 6, 1995 [EP] European Pat. Off. ............. 95119202
Mar. 21, 1996 [EP] European Pat. Off. ............. 96104592

[51] Int. Cl.⁷ ......................................... H04N 7/26
[52] U.S. Cl. ........................................... 348/845
[58] Field of Search ..................... 348/390–392, 348/394, 399, 409, 415, 845, 400, 410, 419, 581, 580, 571; H04N 7/13, 7/133, 7/137

[56] References Cited

U.S. PATENT DOCUMENTS 5,008,752  4/1991  Van Nostrand ........................ 348/581
5,253,059  10/1993  Ansari et al. ........................... 348/424
5,283,656  2/1994  Sugahara ............................. 358/261.1

FOREIGN PATENT DOCUMENTS 0314269  5/1989  European Pat. Off. ......... H04N 5/21
0366919  5/1990  European Pat. Off. ......... H04N 7/13
0527693  2/1993  European Pat. Off. ....... H03H 17/00
0612187  8/1994  European Pat. Off. ......... H04N 7/01
0659020  6/1995  European Pat. Off. ......... H04N 7/26

*Primary Examiner*—David E. Harvey
*Attorney, Agent, or Firm*—Joseph S. Tripoli; Ronald H. Kurdyla

[57] ABSTRACT

An apparatus for pre-processing of a digital video data stream including luminance and chrominance pixel data, the apparatus comprising a plurality of pre-processing units including a horizontal filter unit and a vertical filter unit. The horizontal filter unit is located at an input side and the vertical filter unit is located at an output side of the preprocessing apparatus and wherein all read/write memory for storing data outputted from or inputted to the plurality of pre-processing units is contained in a single memory block.

8 Claims, 7 Drawing Sheets

DIGITAL VIDEO PREPROCESSOR HORIZONTAL AND VERTICAL FILTERS

The invention relates to an apparatus for Pre-processing of digital video data. In this apparatus data compression and encoding, especially conforming to the MPEG-2 Video Standard (ISO/IEC 13818-2) is carried out.

BACKGROUND

ISO/IEC have standardised video compression methods for standard resolution as well as high resolution video signals and pictures, the so-called MPEG-2 standard.

MPEG-2 provides for three different picture coding types: Intra (I), Predicted (P) and Bidirectionally predicted or interpolated (B) frames or fields. Still, in p and B frames or fields, macro blocks can be coded intraframe or intrafield, respectively, if motion prediction does not give good results. The decision has to be made in the encoder, with criteria to be determined by the implementation. In addition, MPEG-2 allows for frame or field based DCT (Discrete Cosine Transform), which requires sorting of lines and another decision to be made by the encoder.

In digital video broadcasting applications, decoders are usually needed in a high volume while only a small number of encoders are employed to provide the service. A typical configuration is given by the DirecTv satellite service in the USA, where MPEG-2 encoders for about 150 simultaneous programs provide a nation-wide broadcasting service. This requires relatively cheap decoders whereas encoders can include more exhaustive circuitry and can be more expensive.

MPEG-2 video encoding and decoding can be implemented in an asymmetrical manner in which encoders include a high degree of complex circuitry while decoders must include only that range of functionality absolutely required to decode valid bit streams.

For that purpose, MPEG defines the syntax and the semantics of the bit stream and a so-called System Target Decoder. The implementation of the encoder is not ruled by the standard. This allows one to built relatively simple encoders for applications with low demands on picture quality, as well as very complex encoders for high quality requirements.

For video broadcasting and entertainment applications reference levels for picture quality are set by existing video standards. For broadcasting of live events real-time operation of the encoder is a must. In order to cope with all different digital video applications and their respective requirements, the so-called MPEG Committee (Working Group 11 of ISO/IEC) has defined a set of Profiles and Levels. Profiles determine a certain subset of encoding tools belonging to the MPEG-2 standard. Different tools are used for specific encoding methods and applications. Levels restrict the vast ranges of parameters to those numbers which are used in common applications such as video broadcasting or video transmission over networks.

For video broadcasting services standard resolution video is related to ITU-R Recommendation 601 specifications or subsets of these, and can be handled by MPEG-2 Main Profile at Main Level (MP@ML). High definition video can be covered by the parameter sets defined in the High Levels of MPEG-2 (e.g. MP@HL).

The Main Profile comprises compression methods for video in the so-called 4:2:0 format, and it defines a variety of motion compensation and encoding modes, which are needed for high compression ratios. Motion compensation in the MP is based on frame and field based prediction in forward and backward direction, and includes refinements specifically targeted for interlaced video signals, such as the Dual Prime technique. For encoding, the MP allows frame and field based DCT, linear and non-linear quantization, standard and alternative zigzag scanning, and more.

Digital video broadcasting services will be based on bit rates in the range from as low as 1 Mbit/s up to about 10 Mbit/s. Raw data rates of video signals digitised according to the ITU-R Recommendation 601 comprise about 166 Mbit/s, without blanking intervals, clock and synchronisation. For a typical bit rate of 4 Mbit/s, which shall provide picture quality similar to existing NTSC and PAL video standards, a compression factor in the range of 40 is needed.

Compression ratios in this range are relatively easy to achieve for video signals which originate from film material, due to their non-interlaced nature and their low temporal repetition rate of 24 Hz. Much more demanding requirements come from real video signals originated from video cameras, especially in sequences with rapid and random motion. For adequate reproduction of such pictures at high compression ratios, all motion prediction and encoding alternatives provided by MPEG-2 MP are mandatory.

In particular, the standard does not specify at all, how video signals should be prepared for compression. In many cases, it is desirable to reduce the number of pixels before compression. The pixel decimation process can be applied in horizontal and vertical picture dimensions but in any case, it requires appropriate pre-filtering. The same applies to the conversion from the so-called 4:2:2 $YC_bC_r$ format to the 4:2:0 definition, as required for MPEG encoding. Also, it is a well-known fact, that pictures with noisy behaviour are not well suited for compression, due to the random nature of the noise components. A variety of noise reduction techniques can be applied before encoding, for instance, field and frame recursive averaging methods. Furthermore, it is not necessary to encode fields which appear twice in the video signal due to 3:2 pull-down. In the pre-processing stage, a detection and elimination of redundant fields is useful and can be implemented in conjunction with other pre-processing methods. The same holds for horizontal and vertical blanking intervals in the video signal, which can be eliminated also before encoding, thus giving more processing time for the compression itself.

SUMMARY OF THE INVENTION

It is one object of the invention to build a pre-processing apparatus which allows one to pre-process digital video signals by means of VLSI circuitry before compression and encoding.

Due to the feature of the invention that all memory requirements are solved by one single memory block, it is possible to implement a standard memory device.

Due to the processing described herein it is possible to save a lot of line memory in a vertical filter unit. All line memories required for vertical filtering can be accomplished by reading the appropriate data from neighbouring lines from the memory in macro block sizes.

The filter and decimation path at the input of the apparatus has the advantage that the amount of memory space occupied is minimal.

Advantageous features also include cache memories to allow accommodation of multiple data transfers from and to the single memory block at suitable time slots. Especially it provides flexible access to video data belonging to different time instants, such as previous lines, fields and frames.

The function of the pre-processor serves for ordering of data for encoding as well as timely forwarding of video image data to consecutive circuits: field to frame reordering, line to block reordering, frame reordering for bi-directional prediction and delay of video image data with help of external memory device. The pre-processing function can receive and process picture data of various picture sizes, in order to allow for encoding of standard resolution video as well as higher resolution pictures. The pre-processing function also serves for image analysis: detection of interlace pictures, detection of movie type images, detection of redundant fields due to 3:2 pulldown. It also allows for synchronisation of complete encoder by detection of sync control words in input video data and by signaling of picture and macro block starts to the external controller and to other circuits architecture. It may also allow for extraction of user and auxiliary data in input video data and transmission of this data to external controller.

DRAWINGS

Figure 2:
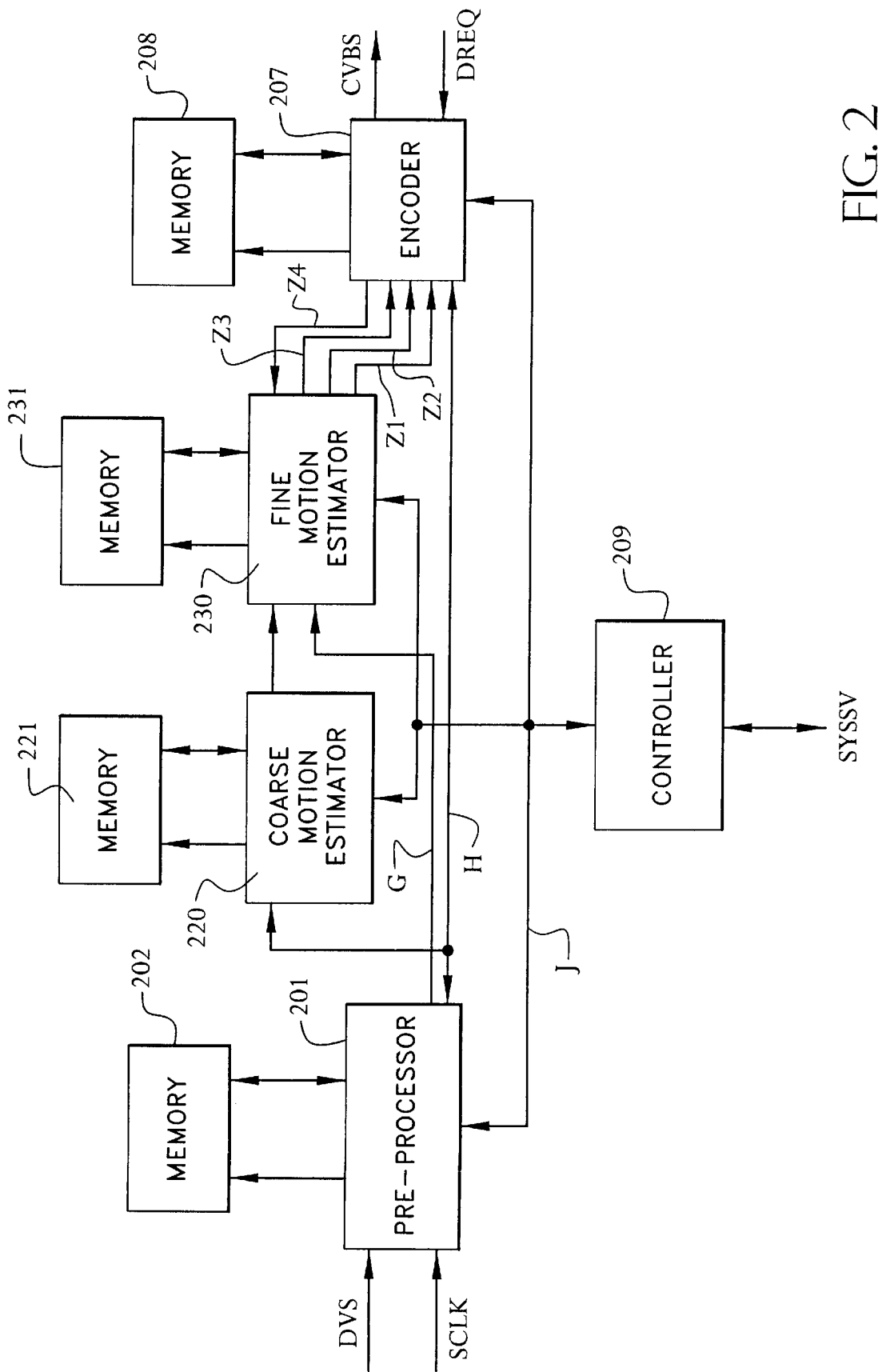
Figure 3:
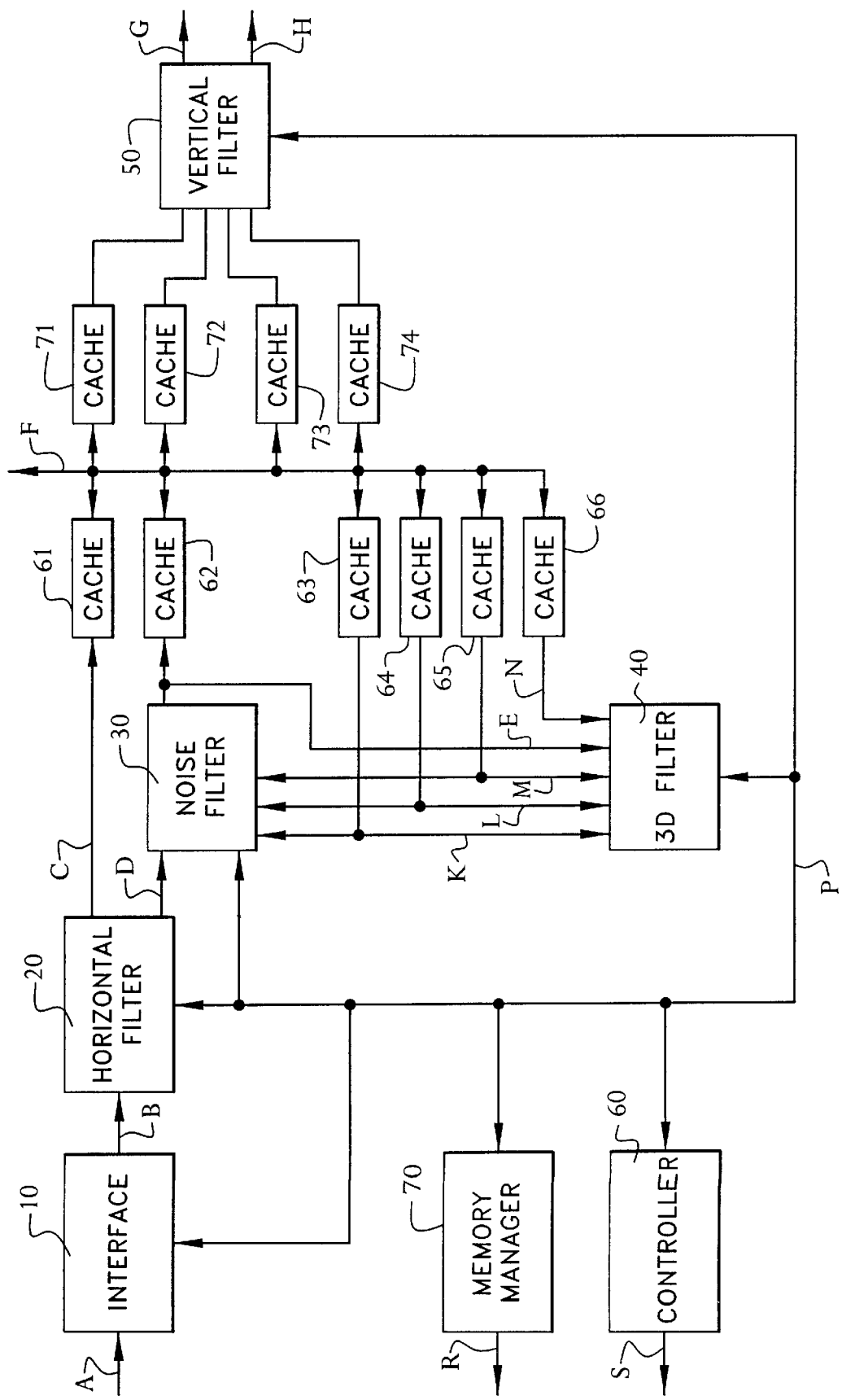
Figure 4:
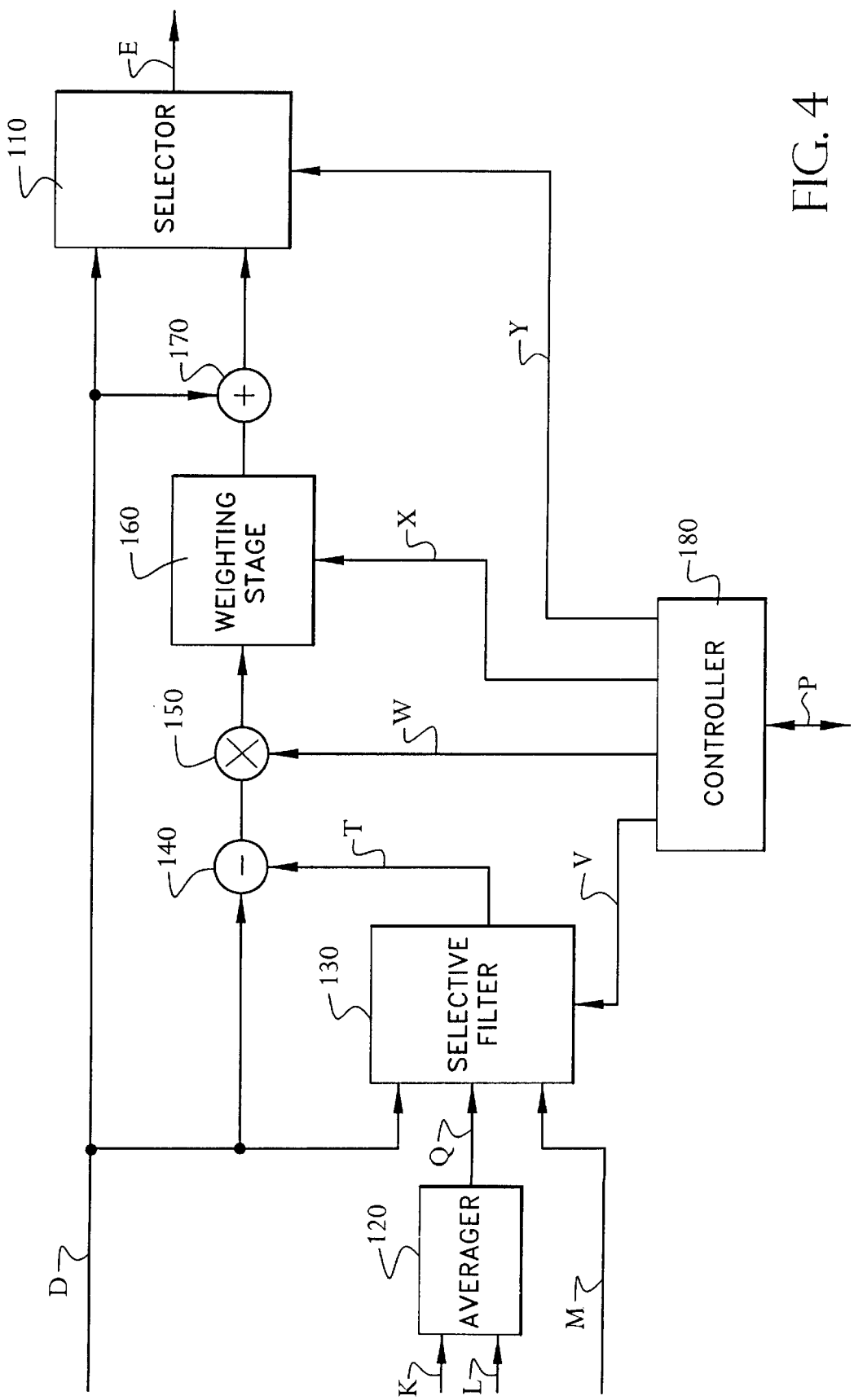
Figure 5:
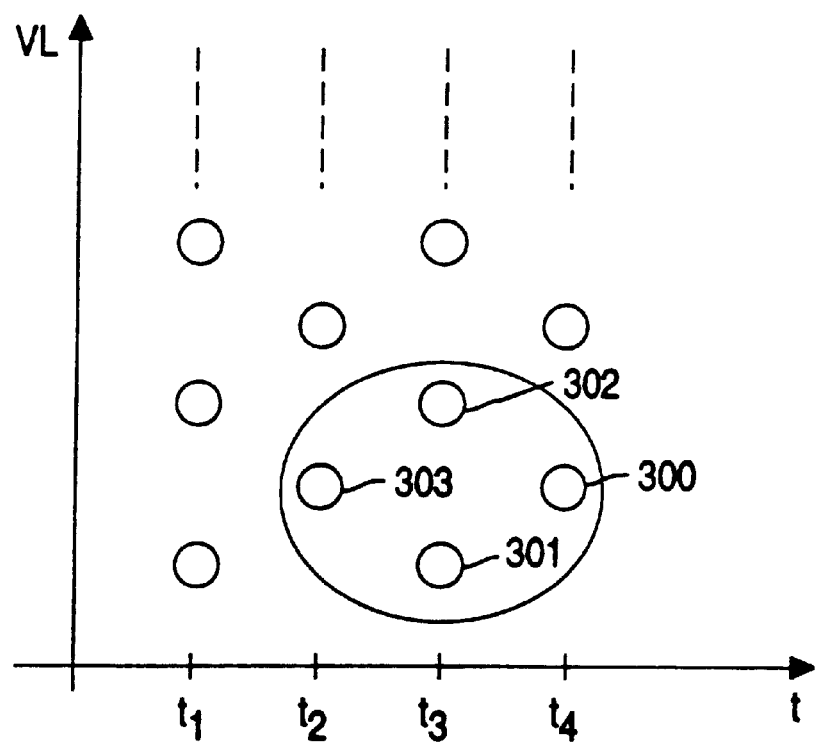
Figure 6:
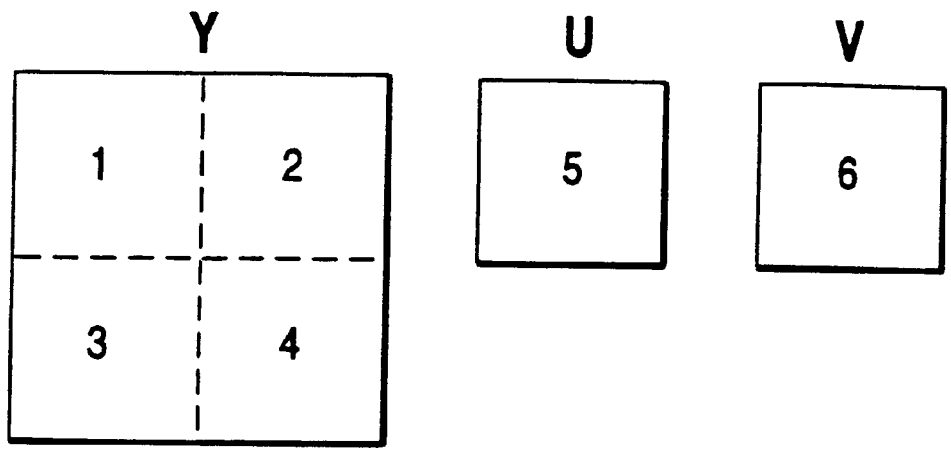
Figure 7:
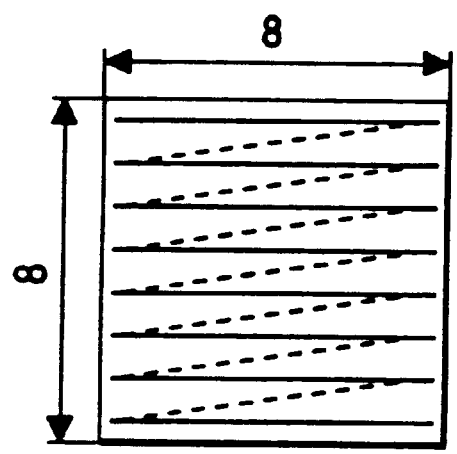
Figure 8:
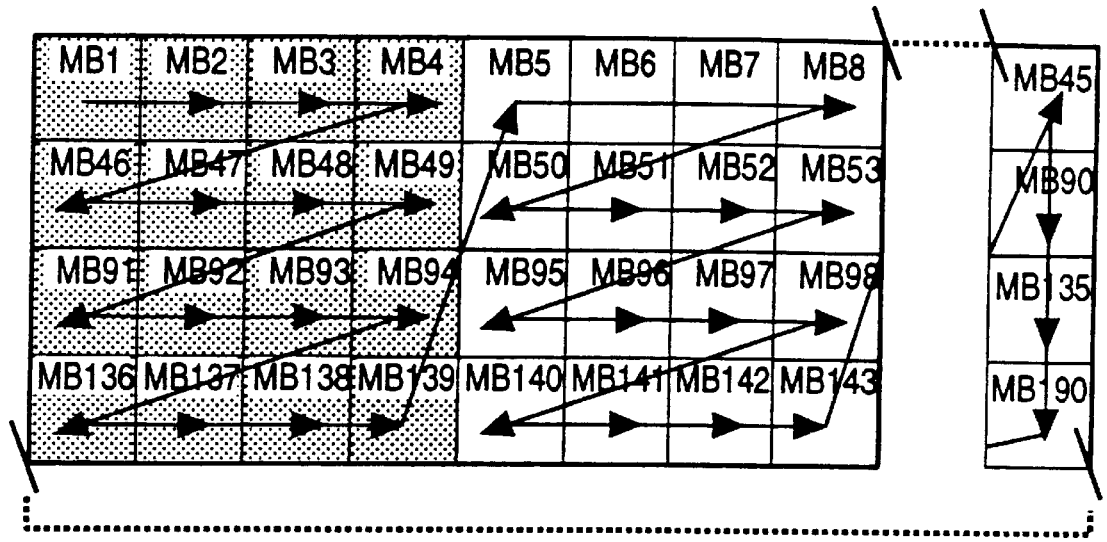
Figure 9:
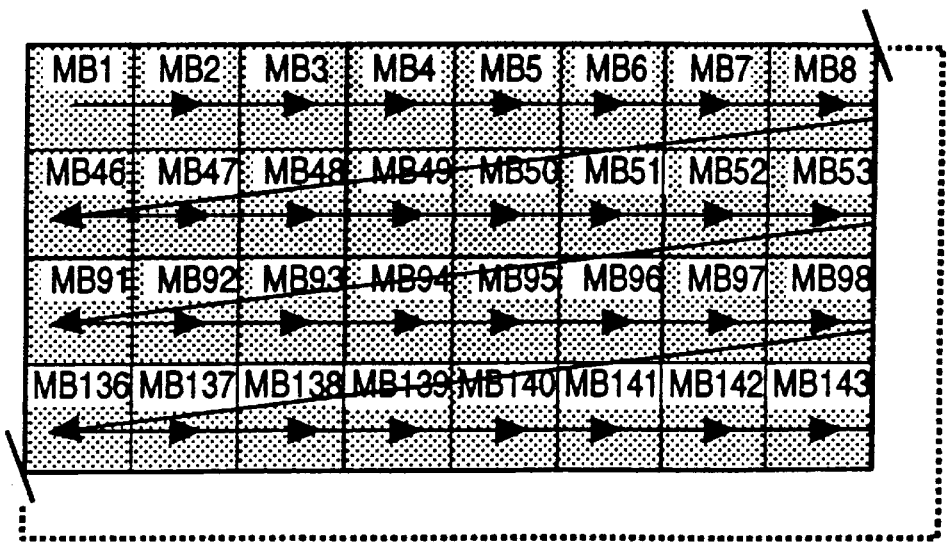

Preferred embodiments of the invention are described with reference to the accompanying drawings which show in:

FIG. 1—a first principle functional block diagram of an arrangement in which an apparatus according to the invention is used;

FIG. 2—a second principle functional block diagram of an arrangement in which an apparatus according to the invention is used;

FIG. 3—a basic block diagram of an apparatus according to the invention;

FIG. 4—an example for a noise reduction filter structure;

FIG. 5—an access constellation for the noise reduction filter;

FIG. 6—the blocks of a YUV macro block and their output in macro block scan order;

FIG. 7—the block scan order of each block of a macro block;

FIG. 8—the output order for luminance macro blocks of a frame;

FIG. 9—the output order for YUV macro blocks of a frame.

PREFERRED EMBODIMENTS

The invention deals with pre-processing of video data signals. The pre-processing apparatus works together with a motion estimation stage and a bit stream encoding stage as shown in FIG. 1. In this architecture the processing functions required for MPEG-2 encoding are organized in three main ICs or stages. Pre-processing stage 201 contains all input and pre-processing functions required for data compression. Motion estimation stage 203 contains all motion estimation and motion prediction functions, and bit stream encoding stage 207 includes all bit stream generation functions for MPEG-2 encoding, but does not include motion prediction.

Each of these main processing stages has an interface to an external memory 202, 204, and 208, as well as an interface to a controller 209, which provides for all programmable options of the encoder. Stages 201, 203 and 207 may contain hardwired functionality as well as programmable circuits, such as micro controller or microcomputer cores which operate with respective software.

Due to this partitioning of functions, which is an aspect of another invention of the applicant, described in a related European patent application EP 95 119 207, each of the stages 201, 203 and 207 may be realised in one VLSI chip, since all stages contain just that many processing elements, as can be implemented on singular integrated circuits with the current state of the art VLSI technology, i.e. 0,8µ 2-layer HCMOS4 technology.

Memories 202, 204 and 208 may consist of standard memory devices, such as 4 MBit DRAMs, SDRAMs or other feasible memories.

It is an important part of the invention that at the input of pre-processing stage 201 standard digital video signals in $YC_bC_r$ format related to ITU-R Recommendation 601 may be used, together with standard video synchronisation signals including e.g. 13; 5 MHz clock, whereas the interfaces between stages 201 and 203 and between stages 203 and 207 relate to a specific definition, which will be explained in the related European patent application EP 95 119 207 of the applicant. The encoder output interface at stage 207 provides at its output CVBS a compressed MPEG-2 video bit stream, such as the Packetized Elementary Bit stream (PES) defined in ISO 13818, together with suitable synchronisation signals. This bit stream can be read out using the data request input DREQ.

Pre-processing stage 201 is connected via a first bus G to motion estimation stage 203 and via a second bus H to bit stream encoding stage 207 for coding complexity pre-analysing purposes. Pre-analysing allows additional kinds of rate control within each macro block by adjusting the relevant coding parameters like intra/inter and field/frame decision. The interfaces of stages 201, 203 and 207 to the controller 209 are connected via a bi-directional third bus J and may use standard data, address and synchronisation definitions as related to standard controller devices, such as Motorola or Texas Instruments circuits, e.g. TMS 320030. The controller 209, again, has an interface via bus SYSSV to the overall systems control, or a user interface computer, from where it receives parameters for encoder set-up, mode selection, etc. Via bus SYSSV encoder status information, such as error codes, may be communicated.

Specifically, stage 201 contains all pre-processing and data re-ordering functions. These functions may include horizontal and vertical filtering and decimation for the conversion from the original picture format to the encoding format, e.g. from 720 to 544 pixels per active line. As an example, conversion from so-called 4:2:2 $YC_bC_r$ organisation, appropriate filtering and decimation of the chrominance signals to achieve the 4:2:0 encoding format, may be part of the processing functions in stage 201. Another important task of the circuit in stage 201 is the elimination of horizontal and vertical blanking intervals and the re-ordering of video data from field and line sequential scanning to the appropriate macro block related scanning order which is useful for MPGE-2 encoding. Stage 201 provides different types of macro block data, such as luminance and $YC_bC_r$ data, with their appropriate timing behaviour for the subsequent processing blocks of the overall encoder. Other processing options, such as noise reduction and the detection of redundant fields in case of movie picture sequences, may be part of the functionality in stage 201. This pre-processing stage in the video encoding architecture is also responsible for detecting synchronisation signals at its SCLK input and for generating synchronisation signals for the respective macro block output signals and for the rest of the encoder circuits.

Motion estimation stage 203 includes all motion estimation processing as required for MPEG-2 encoding, and includes preferably also motion prediction functionality as is described in another relating European patent application EP 95 402 787 of the applicant. Stage 207 contains in particular the DCT and its inverse, quantization and inverse quantization, run length and variable length coding functions, header assembling, and packetization. This specific partitioning of functions is suitable and advantageous. This stage 207 is described in a further European patent application EP 95 402 786 of the applicant.

The parallel interfaces may use a 27 MHz clock, whereas the general processing clock rate is e.g. 54 MHz. The basic encoding functions, as far as MPEG1 is concerned, can be carried out with a circuitry like on the STi3230 chip of SGS-Thomson. Motion estimation and motion estimation controller circuitry as such is known from the STi3220 and STi3223 chips of SGS-Thomson. DCT and inverse DCT can be carried out using circuitry like on the IMSA121, STV3208 and STV3200 chips of SGS-Thomson.

In a more detailed pictorial, FIG. 2 shows another embodiment of the invention. Some reference numbers are identical with reference numbers used in FIG. 1. They denote the same components as explained with respect to FIG. 1. Therefore they need not to be explained here once again. The realisation of stage 203 is now done in an alternative manner. The functionality of stage 203 is partitioned into a coarse motion estimation stage 220 and a fine motion estimation stage 230. This hierarchical motion estimation is related to more elaborate motion estimation techniques, where more processing power is needed for implementing motion vector search procedures. Stages 220 and 230 operate on luminance signals but can in addition operate on chrominance signals. Stage 230 preferably calculates motion vectors having ½-pel accuracy.

Both stages 220 and 230 are connected by a bus and have their own interfaces to standard memories 221 and 231 respectively. Controller 209 is connected also to stage 220 and stage 230 via bidirectional bus J.

In this architecture, coarse motion estimation stage 220 receives its input signals from pre-processing stage 201 via bus H. The same bus is connected to bit stream encoding stage 207 for coding complexity pre-analysing purposes. Pre-processing stage 201 provides another signal on bus G directly to fine motion estimation stage 230. Preferably, bus H transfers no chrominance data whereas bus G does.

Advantageously on buses G and H video picture data is carried in a specific order, related to MPGE-2 macro block organisation, together with specific synchronisation signals. The $YC_bC_r$ data on bus G may be delayed by one frame compared to the corresponding data on bus H.

On the bus connecting coarse and fine motion estimators 220 and 230 data from initial motion vectors, as computed in coarse motion estimation stage 220, is carried to fine motion estimation stage 230, which computes the final motion vectors.

Bus J carries the standard controller interface signals.

On bus Z1 macro block data is carried from stage 230 to stage 207. This is the corresponding data as carried on bus G, but delayed according to the processing time in stage 230.

Bus Z2 also transfers predicted macro block data from stage 230 to stage 207. This macro block data relates to the fine motion vectors and prediction modes which are calculated in stage 230 and forwarded on bus Z3 to stage 207. More detailed explanations concerning the coarse motion estimation stage 220 are given in a further patent application of the applicant (FR 9110158). The fine motion estimation stage 230 is described in more detail in another European patent application EP 95 402 787 of the applicant.

FIG. 3 depicts stage 201 in more detail. In FIG. 3 reference numeral 10 denotes an interface block. Via data bus A input video data is fed to interface block 10. In this interface block 10 incoming data is formatted and existing synchronisation signals are detected and based on this new synchronisation signals are generated. The new synchronisation signals e.g. macroblock synchronisation signals or picture synchronisation signals are strictly based on the requirements of bus F which will be described below. Also the horizontal blanking interval of the video signal is eliminated. The interface block 10 transfers the luminance and chrominance pixel data via a bus B to a horizontal filter unit 20.

This filter unit 20 may work on luminance and chrominance pixel data in parallel or in sequential fashion. The filter performs horizontal lowpass filtering and decimation for luminance and chrominance data. This filter can be implemented with the well known FIR filter structure. Different filter shapes and bandwidths can be implemented with a structure which uses programmable coefficients.

Resulting luminance pixel data is forwarded through data bus D to the next filtering stage 30, while chrominance pixel data is sent via data bus C to a cache memory unit 61. This pixel data is transported from cache memory 61 to the external memory unit 202 via bi-directional data bus F. Filtering stage 30 is a noise reduction filter unit which will be described lateren. After passing the filter stage 30, the luminance pixel data is forwarded via data bus E to cache memory 62 from where it will be transported to the external memory unit 202 via data bus F.

Data bus E is also connected to another filtering unit 40. This filtering unit 40 is a three-dimensional digital filter. It contains a selection and analysis function for the detection of interlaced or progressively scanned pictures and for discrimination of redundant fields in connection with 3:2 pull down mode. Interlaced scan and redundant fields can be found in the video sequence by comparisons of successive fields, in conjunction with an analysis of picture statistics. Such operations are already disclosed in certain documents and well known to those skilled in the art. Five input data buses E, K, L, M, N, are provided for unit 40. Each one of these data buses is connected to an appropriate cache memory 62 to 66. Data buses K, L, M, are also connected to filter unit 30. This arrangement allows an observation and comparison interval of e.g. 4 fields or frames, whereby in external memory 202 the required fields are stored.

Advantageously noise filtering stage 30 and filtering unit 40 make use of the same data and cache memories as far as possible. The pre-processor arrangement contains a further filter unit 50. This filter unit provides vertical filtering and possibly decimation of luminance and chrominance pixel data. The vertical filtering process required for decimating coding formats and for 4:2:2 to 4:2:0 conversion by comparing pixel data of neighbouring lines is also well known from certain published documents. According to the present invention the appropriate data from neighbouring lines for the vertical filtering process is read from the memory in macro block size order. This means, that the vertical filtering process is carried out separately for each macro block. For this purpose four cache memories 71 to 74 are provided which are connected to data bus F. This allows, that some line memories required for vertical filtering need not to be implemented in the vertical filter unit itself. Advantageously, the vertical filter unit 50 is implemented at the output side of pre-processing stage 201, subsequent to the data bus F, so all required data is available in external memory unit 202. Suitable vertical overlap data at the macroblock borders for the settling period of the filter must also be read together with the respective data block which is fed to the filter 50. The filter can be implemented in a standard FIR manner, with selectable filter characteristics via programmable coefficients.

The pre-processor arrangement includes also a control unit 60 and a memory management unit 70. The control unit 60 is connected via a control, data and address bus P to all filter units 20, 30, 40, 50, interface block 10 and memory management unit 70. It is responsible for setting up all modes and parameters of the connected devices. It also gives respective signals to the memory management unit 70, which performs memory address calculation for the external memory unit 202 connected to bus F. The address data is transferred via bus R to memory 202. Control unit 60 and memory unit 70 may be an integral part of the VLSI circuit of the pre-processor arrangement.

For the filter units 30, 40 and 50, pixel data is read from memory 202 via bus F and written into temporary cache memories 63–66 and 71–74. This provides flexible access to video data belonging to different time instants, such as previous lines, fields and frames. The cache memories make use of free time slots on the related buses.

In this invention, pixel data is written to memory 202 via bus F in line and field sequential manner. For cache memories 63–66, it is retrieved in the same scanning order, but for respective time instants. For generating the output signals of the complete pre-processing unit, luminance and chrominance pixels are read from memory 202 in a macro block scan order, which order is suitable for motion estimation and compression. E.g. two independent output signals are generated for data buses G and H, one for final compression in stage 207 and the other for possibly coarse motion estimation or possibly fine motion estimation and pre-analysing purposes for final compression. Adavantageously the time lag of the motion estimation can be compensated for by the read out time of the data from memory. Thereby the respective luminance and possibly chrominance data on buses G and H can have a delay of several fields and memory 202 will serve for different purposes.

As mentioned above, the filter unit 30 is a noise reduction filter and may be a recursive filter as known from other applications. An advantageous example of such filter unit is shown in FIG. 4.

Advantageously, all horizontal processing is located prior to bus F. Decimated video data only are transferred on bus F and stored in memory 202. In FIG. 4, the current access time video data is fed directly to a selector 110 via data bus D. Selector 110 is connected at its output to bus E and allows to select between the original incoming data on bus D or the filtered data behind adder 170. The filtered data results from a combination of the data on buses K, L, M and D with weighting functions. First, video data on buses K and L represent video lines, which are spaced by one line against each other and 262 or 263 line periods (example: 525 line system) away from the actual line data of the current time instant on bus D, are averaged in block 120 having an output bus Q. Next, an averaging or selective filter unit 130 is used for the combination or selection of digitalized signals on buses D, M and Q. The data on bus D is subtracted from the resulting signal on bus T in subtractor 140 and fed to the multiplier 150. The multiplier 150 outputs the results via an appropriate bus to a weighting stage 160, which provides for a non-linear function. Its output data is combined with the original data on bus D in adder 170, to provide the filtered output data for selector 110. The multiplication factor for multiplier 150, the weighting curves of stage 160 and the operation of selector 110 as well as the selection signals and filter coefficients for unit 130 are controlled by a control unit 180 via respective buses W, X, Y, V. Of course the whole filter unit 30 can be implemented by a computer program which is executed by an appropriate microprocessor. Depending on the filter functions and weighting curves, the complete filter shown in FIG. 4 allows an averaging of picture content over neighbouring lines, fields and frames, with a particular treatment of low level signals, which in most cases represent noise.

FIG. 5 illustrates the access points to neighbouring lines and fields of video pictures for the filter shown in FIG. 4. In FIG. 5 columns of video lines are shown at different time instants $t_1$ to $t_4$. This figure is an example for interlaced pictures. The video lines at time instant $t_1$ are valid for a first half of an interlaced picture and the video lines at time instant $t_2$ are valid for the respective second half of the picture. Video line 300 at time instant $t_4$ is the current video line for which a noise reduction is desired. Video lines 301 and 302 are neighbouring video lines of video line 300 being transferred one field before the current video line 300. Video line 303 is a video line being transferred one frame before the current video line 300. In a standard video system with 525 video lines, video line 303 is delayed by 525 video lines, while video line 301 is delayed by 262 and video line 302 by 263 video lines. Noise reduction for video line 300 is calculated on the basis of the previous video lines 301 to 303. The pixel data for the current video line 300 is input to the noise reduction filter 30 via bus D, while the pixel data for the video lines 301 to 303 are input to filter 30 via respective buses K, L, M.

FIG. 6 shows the well known 4:2:0 macro block structure of a frame, which is also used in the MPEG2-Standard. This macro block structure is also called YUV macro block structure. The outputted frames are partitioned into macro blocks. The 16*16 macro block is transferred as six smaller blocks in macro block scan order, as indicated in FIG. 6 by the numbers. Each smaller block shown in FIG. 6 is organized as it is shown in FIG. 7. Each smaller block contains eight lines of eight pixels values each.

The luminance macro blocks consisting of luminance blocks Y are outputted from the pre-processor apparatus via data bus H in the order as shown in FIG. 8. That means, the first four macro blocks of the first macro block row, then the first four macro blocks of the second macro block row, then the first four macro blocks of the third macro block row and so on. FIG. 8 shows an example for a 720*480 pixel image with 45 macro blocks per row.

The socalled YUV macro blocks consisting of luminance blocks Y and chrominance blocks U, V or more general blocks $C_b$ and $C_r$ are outputted from the pre-processor apparatus via data bus G in different order compared to the luminance macro blocks. This output order is shown in FIG. 9. At first, the first row of macro blocks MB1 to MB45 is outputted, then the second row macro blocks MB46 to MB90 is outputted and so on.

We claim:

1. Apparatus for pre-processing of a digital video data stream including luminance and chrominance pixel data, the apparatus comprising a plurality of pre-processing units which prepare said digital video data stream for compression and encoding, wherein said plurality of pre-processing units include a horizontal filter unit, a vertical filter unit, and at least one decimation unit, wherein said horizontal filter unit is located at an input side and said vertical filter unit is located at an output side of the preprocessing apparatus, and wherein all read/write memory for storing data outputted from or inputted to said plurality of pre-processing units is contained in a single memory block which is connected to the plurality of preprocessing units via a data bus and a number of cache memories, and wherein said single memory block is fed with decimated video data.

2. Apparatus according to claim 1, further comprising an interface block having an input for receiving said digital video data stream and an output which is connected to the horizontal filter unit, wherein said interface block formats said video data and detects existing synchronization signals in said digital video data stream for generating new synchronization signals in response thereto.

3. Apparatus according to claim 1, wherein said plurality of preprocessing units further includes a video noise reduction filter unit connected to an output of said horizontal filter unit, wherein remaining luminance pixel data only are forwarded to the video noise reduction filter preprocessor unit.

4. Apparatus according to claim 1, wherein said plurality of preprocessing units further includes a field filter unit for discrimination of redundant fields.

5. Apparatus according to claim 1, wherein the vertical filter unit reads out luminance and chrominance pixel data from the single memory block in macro block scan order after said luminance and chrominance pixel data has been filtered in said horizontal filter unit, noise reduction filter unit and field filter unit.

6. Apparatus according to claim 1, wherein at least two independent respective output data streams including video data are generated by the vertical filter unit, wherein said video data is delayed by several fields relative to each other.

7. Apparatus according to claim 6, wherein one of the output data streams is provided for a following coarse motion estimation and the other for following fine motion estimation and final data compression.

8. Apparatus according to claim 7, wherein a time lag due to the coarse motion estimation is compensated by virtue of a previous read out of the corresponding data from said single memory block.

* * * * *